(12) United States Patent
Ozawa

(10) Patent No.: US 9,001,715 B2
(45) Date of Patent: Apr. 7, 2015

(54) APPARATUS AND METHOD FOR GATEWAY AND PROGRAM

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 529 days.

(21) Appl. No.: 13/000,343

(22) PCT Filed: Jul. 14, 2009

(86) PCT No.: PCT/JP2009/062711
§ 371 (c)(1),
(2), (4) Date: Dec. 20, 2010

(87) PCT Pub. No.: WO2010/007977
PCT Pub. Date: Jan. 21, 2010

(65) Prior Publication Data
US 2011/0103278 A1    May 5, 2011

(30) Foreign Application Priority Data
Jul. 16, 2008  (JP) .................................. 2008-185008

(51) Int. Cl.
*H04B 7/00* (2006.01)
*H04L 12/28* (2006.01)
(Continued)

(52) U.S. Cl.
CPC ............ *H04L 12/66* (2013.01); *H04L 12/6418* (2013.01); *H04M 7/0072* (2013.01); *H04W 88/16* (2013.01); *H04L 65/104* (2013.01); *H04M 7/123* (2013.01); *H04M 7/1235* (2013.01); *H04M 7/127* (2013.01); *H04M 2201/50* (2013.01);
(Continued)

(58) Field of Classification Search
USPC .................................................. 370/310, 401
See application file for complete search history.

(56) References Cited

U.S. PATENT DOCUMENTS

2006/0168354 A1 * 7/2006 Hutter ........................... 709/250
2007/0291776 A1   12/2007 Kenrick et al.
(Continued)

FOREIGN PATENT DOCUMENTS

JP    2006165935 A    6/2006
JP    2008042767 A    2/2008
(Continued)

OTHER PUBLICATIONS

European search report for EP09797902 dated Dec. 17, 2012.
(Continued)

*Primary Examiner* — Afshawn Towfighi
(74) *Attorney, Agent, or Firm* — Sughrue Mion, PLLC

(57) ABSTRACT

A gateway apparatus arranged between the mobile circuit switched network and the mobile IMS network, includes a call control unit which converts a control signal output from the mobile circuit switched network into at least one of SIP and SDP to output a signal converted to the mobile IMS network and a conversion unit which receives a line switching protocol for an audio signal output from the mobile circuit switched network. The conversion unit decides, using at least one of SIP and SDP, output from the mobile IMS network and received by the call control unit, on whether the partner terminal is to be connected via the mobile IMS network to the mobile circuit switched network, via the mobile IMS network to a fixed network or via the mobile IMS network to a mobile broadband network, then converts the line switching protocol to one of different protocol, depending on a result of the decision, and outputs the protocol converted signal to the mobile IMS network (FIG. 2).

14 Claims, 3 Drawing Sheets

(51) Int. Cl.
  *H04L 12/66* (2006.01)
  *H04L 12/64* (2006.01)
  *H04M 7/00* (2006.01)
  *H04W 88/16* (2009.01)
  *H04L 29/06* (2006.01)
  *H04M 7/12* (2006.01)

(52) U.S. Cl.
  CPC ......... *H04L 65/1016* (2013.01); *H04L 65/1006* (2013.01)

(56) References Cited

U.S. PATENT DOCUMENTS

2009/0232147 A1* 9/2009 Belling et al. ............... 370/401
2011/0181682 A1 7/2011 Kalleitner et al.

FOREIGN PATENT DOCUMENTS

| WO | 03107611 A | 12/2003 |
| WO | 2007040085 A | 4/2007 |
| WO | 2007045264 A | 4/2007 |
| WO | 2007045522 A1 | 4/2007 |
| WO | 2007062674 A | 6/2007 |
| WO | 2008078583 A | 7/2008 |

OTHER PUBLICATIONS

Sjoberg M Westerlund Ericsson A Lakaniemi Nokia Q Xie Motorola J: "Real-Time Transport Protocol (RTP) Payload Format and File Storage Format for the Adaptive Multi-Rate (AMR) and Adaptive Multi-Rate Wideband (AMR-WB) Audio Codecs; rfc3267.txt", 20020602, Jun. 1, 2002.

International Search Report for PCT/JP2009/062711 mailed Aug. 18, 2009.

* cited by examiner

US 9,001,715 B2

APPARATUS AND METHOD FOR GATEWAY AND PROGRAM

REFERENCE TO RELATED APPLICATION

This application is the National Phase of PCT/JP2009/062711, filed Jul. 14, 2009, which is based upon and claims the benefit of the priority of Japanese patent application No. 2008-185008 filed on Jul. 16, 2008, the disclosure of which is incorporated herein in its entirety by reference thereto.

TECHNICAL FIELD

This invention relates to a gateway apparatus arranged between networks. More particularly, it relates to a gateway apparatus connected between a mobile circuit switched network and a mobile IMS (IP Multimedia Subsystem) network. This invention also relates to a corresponding method and a corresponding program.

BACKGROUND

Nowadays, voice telephony services in a mobile phone terminal and a mobile network using the 3G W-CDMA (Code Division Multiple Access) technology, are being implemented using a mobile circuit switched network and a line switching protocol.

On the other hand, with researches and development of high-speed and large-capacity technology for mobile networks, the future trend of mobile networks is towards achieving higher speed and larger capacity on the basis of the IP (Internet Protocol), and also towards introducing LTE (Long Term Evolution) and EPC (Evolved Packet Core) as mobile broadband networks. It may be predicted that an existing voice telephony which makes use of a line switching network, will evolve in future to VoIP (Voice over IP) that makes use of IP-based networks.

As a gateway apparatus, reference may be made to, for example, the following Patent Documents 1 to 3. Patent Document 1 discloses a gateway apparatus which is connected between a mobile communication network and an IP network and which may adaptively change a gateway function under a command from a service management apparatus and perform protocol conversion depending on a service class of an application. Patent Document 2 discloses a configuration of a gateway apparatus which is connected between a line switching network and an IP network and which if a display size on a terminal on the line switching network is not coincident with one on the IP network side, a transcoder comes into operation to convert a hit stream. Patent Document 3 discloses a configuration of a gateway apparatus which is arranged between an IP network and a line switching network and which includes a means for transmitting a connection target information message, indicating that the connection target is a television telephone terminal for a switched network, to a television telephone terminal for IP in response to a call request for call between the television telephone terminal for IP and the television telephone terminal for the switched network. In none of these Patent Documents, there is disclosed a gateway apparatus in which a line switching protocol for audio is converted and is transmitted to a mobile IMS network.

[Patent Document 1]
WO2003/107611
[Patent Document 2]
JP Patent Kokai Publication No. JP-P2006-165935A
[Patent Document 3]
JP Patent Kokai Publication No. JP-P2008-42767A

SUMMARY

The entire disclosures of Patent Documents 1-3 are incorporated herein by reference thereto. The following is an analysis made from the side of the present invention. In the current transitioning period of the aforementioned evolution, it is necessary to interconnect voice telephony using an existing line switching network and VoIP on LTE or EPC via a mobile IMS (IP Multimedia Subsystem) network. As for details of the IMS, reference may be made to the TS23.228 standard of 3GPP (3rd Generation Party).

However, such interconnection is difficult because there lacks at present a gateway apparatus that will render such interconnection possible.

It is therefore an object of the present invention to provide a gateway apparatus, a method and a program, that enable interconnection between a communication terminal connected to a mobile circuit switched network and a partner terminal via a mobile IMS network to allow to implement voice telephony.

To solve one or more of the above problems, the invention disclosed by the present invention may be summarized substantially as follows, though not limited thereto.

According to a present invention, there is provided a gateway apparatus (a method or program thereof), wherein the gateway apparatus arranged between a mobile circuit switched network and a mobile IMS (IP Multimedia Subsystem) network, converts a control signal from a side of the mobile circuit switched network to output a signal converted to the mobile IMS network, makes a decision on a network beyond the mobile IMS network, or on a type of a terminal as a connection target, using a control signal from the side of the mobile IMS network, and performs protocol conversion of a line switching protocol for audio from a communication terminal on the side of the mobile circuit switched network based on the result of the decision to output the protocol converted to the mobile IMS network.

In one aspect of the present invention, there is provided a gateway apparatus (a method or program thereof), wherein the gateway apparatus arranged between a mobile circuit switched network and a mobile IMS network, converts a control signal output from the mobile circuit switched network into at least one of SIP and SDP to output a signal converted to the mobile IMS network, receives a line switching protocol for audio output from the mobile circuit switched network, decides, using at least one of SIP and SDP output from the mobile IMS network, on whether a partner terminal is connected via the mobile IMS network to the mobile circuit switched network, via the mobile IMS network to a fixed network, or via the mobile IMS network to a mobile broadband network, and performs protocol conversion of the line switching protocol received into a different protocol, depending on a result of the decision to output the protocol converted to the mobile IMS network.

In another aspect of the present invention, there is provided a gateway apparatus (a method or a program), wherein the gateway apparatus arranged between a mobile circuit switched network and a mobile IMS network, comprises a conversion unit that converts a control signal output from the mobile circuit switched network into at least one of SIP and SDP to output the protocol converted to the IMS network, receives a line switching protocol for audio output from the mobile circuit switched network, converts the line switching protocol received into the same protocol without dependency on whether a partner terminal is connected via the mobile IMS network to the mobile circuit switched network, via the mobile IMS network to a fixed network or via the mobile IMS network to a mobile broadband network to output the protocol converted to the mobile IMS network.

According to the present invention, interconnection may be enabled between a communication terminal connected to a mobile circuit switched network and a partner terminal via a mobile IMS network, thus implementing a voice telephony.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 1:
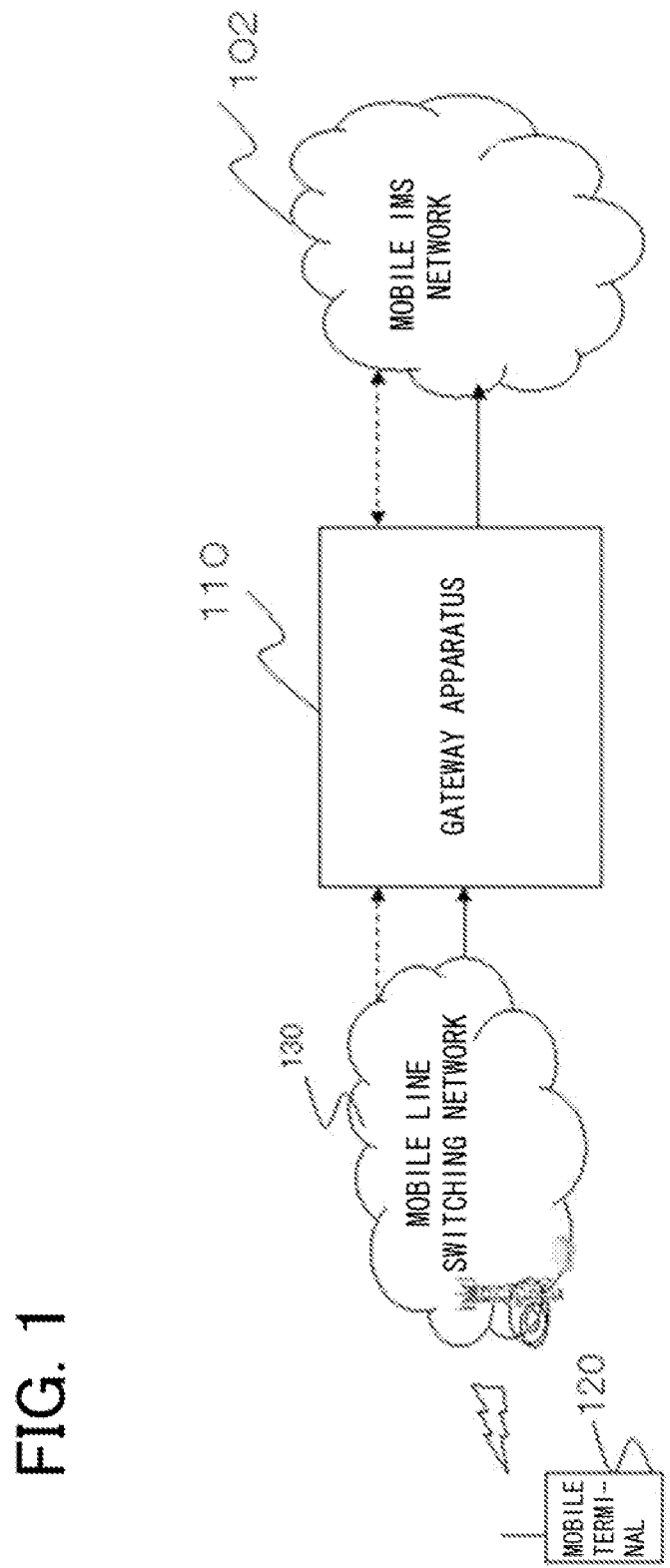
FIG. 1 is a block diagram showing a system configuration of an exemplary embodiment of the present invention.

The present invention will now be described in further detail with reference to the drawings. In a mode of the present invention, a gateway apparatus, arranged between a mobile circuit switched network and a mobile IMS (IP Multimedia Subsystem) network, converts a call control signal from the mobile circuit switched network to output a signal converted to the mobile IMS network. The gateway apparatus makes decision, using control information from the mobile IMS network side, on a type of a network beyond the mobile IMS network or on a type of a partner terminal which is a connection target, and based on the result of the decision, converts the line switching protocol for audio from a communication terminal on the mobile circuit switched network to a different protocol and outputs the protocol converted to the mobile IMS network.

In an exemplary embodiment of the present invention, the gateway converts a control signal output from the mobile circuit switched network into at least one of SIP and SDP to output a converted signal to the mobile IMS network, receives a line switching protocol for audio which is output from the mobile circuit switched network, makes a decision, using at least one of SIP and SDP output from the mobile IMS network, on whether a partner terminal is connected via the mobile IMS network to the mobile circuit switched network, via the mobile IMS network to a fixed network, or via the mobile IMS network to a mobile broadband network, and performs protocol conversion of the line switching protocol received into a different protocol, depending on a result of the decision and outputs the protocol converted to the mobile IMS network.

Alternatively, in another exemplary embodiment, the gateway apparatus converts a control signal output from the mobile circuit switched network into at least one of SIP and SDP to output a converted protocol to the IMS network, receives a line switching protocol for audio which is output from the mobile circuit switched network, and converts the line switching protocol received into the same protocol, without dependency on whether a partner terminal is connected via the mobile IMS network to the mobile circuit switched network, via the mobile IMS network to a fixed network, or via the mobile IMS network to a mobile broadband network and outputs the protocol converted to the mobile IMS network.

According to the present invention, it is able to establish interconnection between an existing mobile terminal connected to a mobile circuit switched network and a partner terminal, which may be even such a terminal that is connected to the mobile circuit switched network via a mobile IMS network, connected to a fixed network via the mobile IMS network, or connected to a mobile broadband network via the mobile IMS network. For any of combinations of the partner terminal, it is possible for the existing mobile terminal to implement voice telephony without redevelopment of the existing mobile terminal. The present invention will now be described with reference to exemplary embodiments.

Exemplary Embodiments

FIG. 1 shows a configuration of an exemplary embodiment of the present invention. There is shown in FIG. 1 a typical network configuration of a gateway apparatus according to an exemplary embodiment of the present invention.

Referring to FIG. 1, a mobile terminal 120 denotes an existing voice telephone terminal connected to a circuit switched mobile network. The mobile terminal 120 is connected to a mobile circuit switched network 130 and transmits/receives a bit stream compressed on encoding in accordance with 12.2 kbps AMR (Adaptive Multi-Rate) audio codec. As regards the specifications of the AMR audio codec, reference may be made to, for example, the 3GPP TS26.090 standard, for example.

The mobile circuit switched network 130 converts an AMR stream into the IuUP (Iu User Plane) line switching protocol in NodeB (BTS (Base Transceiver Station) in a wireless base station: UMTS (Universal Mobile Telecommunications System) and in RNC (Radio Network Controller)), and outputs the protocol resulting from the protocol conversion. As regards the IuUP protocol, reference may be made to 3GPP TS25.415, for example.

A gateway apparatus 110 is connected to RNC, not shown, and inputs a call control signal from the mobile circuit switched network 130, while also inputting, as user data, an IuUP protocol signal, which is a line switching protocol. The gateway apparatus 110 converts the input call control signal into at least one of a SIP (Session Initiation Protocol) signal and an SDP (Session Description Protocol) signal to transmit a signal converted to a mobile IMS network 102.

The gateway apparatus 110 receives at least one of the SIP signal and the SDP signal from the mobile IMS network 102, while also inputting information on a type of a network connected beyond the mobile IMS network 102 or on a type of a partner terminal as a connection target.

The gateway apparatus 110 outputs an RTP (Realtime Transport Protocol) signal to the mobile IMS network 102.

Figure 2:
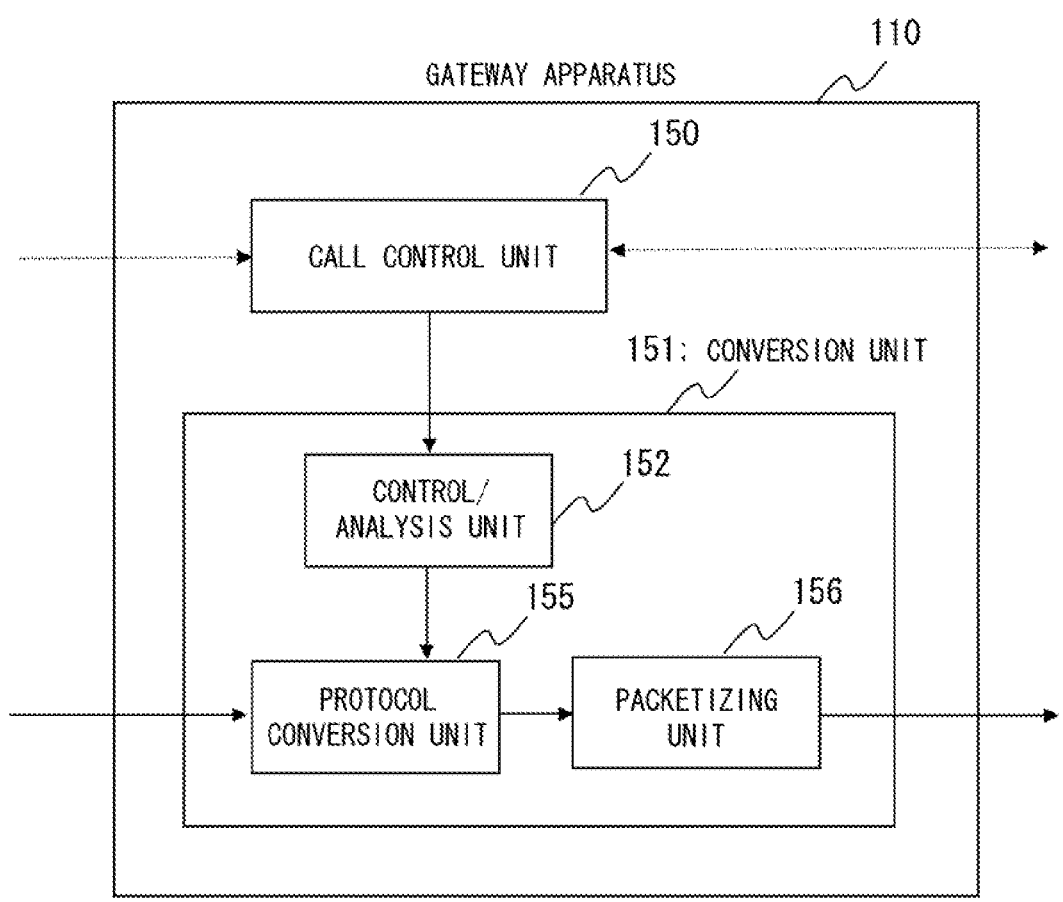
FIG. 2 is a block diagram showing a configuration of an exemplary embodiment of the present invention.

FIG. 2 is a block diagram showing the configuration of the gateway apparatus 110 of FIG. 1. The gateway apparatus 110 includes a call control unit 150 and a conversion unit 151. The conversion unit 151 includes a control/analysis unit 152, a protocol conversion unit 155 and a packetizing unit 156.

The call control unit 150 receives a call control signal from the mobile circuit switched network 130 to convert it into at least one of a SIP signal and a SDP signal and transmits at least one of the SIP signal and SDP signal, resulting from the conversion, to the mobile IMS network 102.

The call control unit 150 receives at least one of a SIP signal and a SDP signal from the mobile IMS network 102, while also inputting the information on a type of a network connected beyond the mobile IMS network 102 or on a type of the partner terminal as a connection target.

The call control unit 150 supplies information contained in the call control signal received from the mobile circuit switched network 130, or information contained in the SIP signal or the SDP signal, received from the mobile IMS network 102, whichever is needed, to the control/analysis unit 152, on a per-channel (per-line) basis.

As for details of SIP or SDP, reference may respectively be made to IFTF (The Internet Engineering Task Force) RFC (Request For Comments) 3261 (Session Initiation Protocol) and to RFC2327 (Session Description Protocol), for instance.

The control/analysis unit 152 compares the channel-based information (the information on a type of a network connected beyond the mobile IMS network 102 or on a type of the partner terminal, for example), received from the call control unit 150, to decide on whether or not protocol conversion is needed. The control/analysis unit 152 outputs the result of the decision, while outputting, in case the protocol conversion has been found to be needed, information on the conversion, that is, information on what sort of conversion is to be conducted, to the protocol conversion unit 155 on a per-channel basis.

The protocol conversion unit 155 receives the IuUP protocol signal from the mobile circuit switched network 130 and reads out a compression-encoded bit stream of speech stored in the IuUP protocol signal.

The protocol conversion unit 155 inputs the result of the decision and the information on the conversion from the control/analysis unit 152 on a per-channel basis. In case the protocol conversion is needed, the protocol conversion unit 155 executes the following format conversion on a per-channel basis, for example, in accordance with the information on the conversion. This format conversion is carried out when storing the compressed encoded bit stream of speech in an RTP payload.

Thus, for a certain channel, the protocol conversion unit 155 constructs an RTP payload format header as specified in IFTF RFC3267 (Real-Time Transport Protocol (RTP) Payload Format and File Storage Format for the Adaptive Multi-Rate (AMR) and Adaptive Multi-Rate Wideband (AMR-WB) Audio Codecs) and then stores the compression encoded bit stream of voice in the payload. Since the frame type information contained in the AMR compression speech encoded bit stream indicates a bit rate, the protocol conversion unit 155 converts it into the RFC3267 codec mode request (CMR) information. It is noted that the CMR information is a signal for mode change to a speech encoder, and that a CMR field value, for example, denotes a frame type.

The protocol conversion unit 155 also sets the octet alignment of RFC3267 and other needed parameters to predetermined setting values. In the format for octet alignment, all of payload fields, inclusive of a payload header, a contents entry table and a speech frame, are individually arrayed in an octet boundary.

For another channel, the protocol conversion unit 155 stores the compression encoded bit stream of speech directly in the payload section without an RTP payload format header.

The packetizing unit 156 inputs the RTP payload information from the protocol conversion unit 155 and then stores the RTP payload information in an RTP packet to output the RTP packet.

In the above first exemplary embodiment, not only the AMR but also other well-known codecs may be used as an audio codec used for generating a compression encoded bit stream of speech data.

Although the control/analysis unit 152 is arranged within the conversion unit 151, it may also be arranged within the call control unit 150.

The call control unit 150 and the conversion unit 151 may be arranged in respective different devices. In the first exemplary embodiment, shown in FIG. 2, the processing and functions of the call control unit 150, control/analysis unit 152 of the conversion unit 151, protocol conversion unit 155 and the packetizing unit 156 may be implemented by a program executed by a computer, such as a processor, a CPU or a data processor, constituting the gateway apparatus 110. There is also provided a computer-readable recording medium in which the program is stored.

Figure 3:
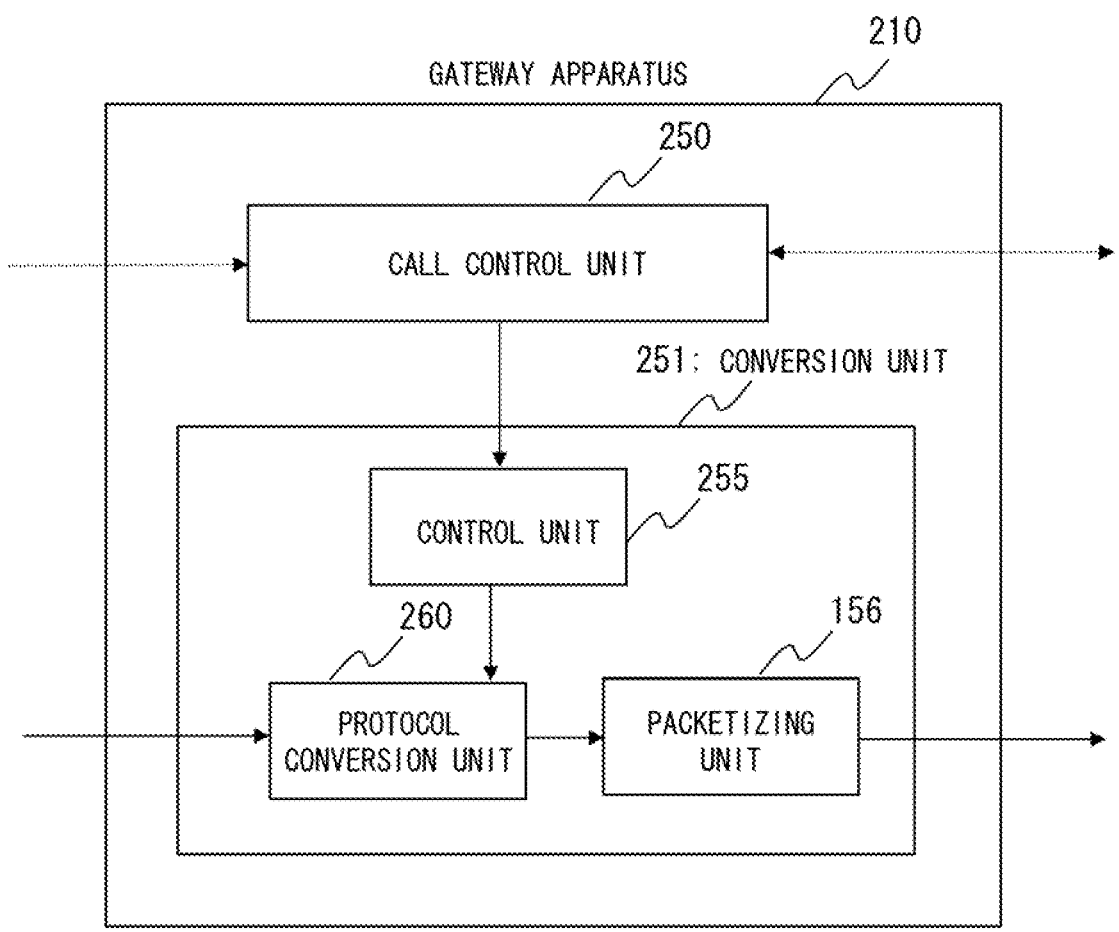
FIG. 3 is a block diagram showing a configuration of another exemplary embodiment of the gateway apparatus according to the present invention.

FIG. 3 shows a configuration of a second exemplary embodiment of the present invention. In FIG. 3, the elements which are the same as those shown in FIG. 2 are attached with the same reference numerals. The elements designated by the same reference numerals perform the same operation and hence the corresponding description is dispensed with.

Referring to FIG. 3, a gateway apparatus 210 includes a call control unit 250 and a conversion unit 251. The conversion unit 251 includes a control unit 255, a protocol conversion unit 260 and a packetizing unit 156.

The call control unit 250 receives a call control signal from the mobile circuit switched network 130, converts the signal into at least one of a SIP signal and an SDP signal and sends the converted signal to the mobile IMS network 102.

The call control unit 250 also receives at least one of the SIP signal and the SDP signal from the mobile IMS network 102, while also inputting the information on the type of a network for connection beyond the mobile IMS network 102 or on the type of a partner terminal as a connection target.

The call control unit 250 outputs the information contained in the call control signal, received on a per-channel basis from the mobile circuit switched network 130, or the information contained in the SIP or SDP, received on a per-channel basis from the mobile IMS network 102, whichever is needed, to the control unit 255 on a per channel (line) basis.

The control unit 255 analyzes the information received from the call control unit 250 and instructs the protocol conversion unit 260 to perform always unique protocol conversion in each channel.

The protocol conversion unit 260 receives the instruction from the control unit 255 to perform always unique protocol conversion in each channel, where the unique conversion means conversion in accordance with RFC3267 (format conversion), as an example.

The protocol conversion unit 260 receives an IuUP protocol signal and reads out the AMR compression encoded bit stream of speech stored. The protocol conversion unit 260 constructs an RTP payload format header as specified in RTP3267, for example, and stores the compression encoded bit stream of speech in a payload.

Since the frame type information contained in the AMR compression encoded bit stream indicates a bit rate, the protocol conversion unit 260 converts it into the codec mode request (CMR) information of RFC3267. Further, the protocol conversion unit 260 converts octet alignment of RFC3267 and other needed parameters into predetermined setting values.

In the second exemplary embodiment of the present invention, an audio codec, used for generating the compression encoded bit stream of speech, may be a well-known codec other than AMR described above. The control unit 255, arranged in the conversion unit 251, may also be arranged in the call control unit 250.

Further, the call control unit 250 and the conversion unit 251 may be arranged in respective distinct apparatuses. In the above second exemplary embodiment of FIG. 3, the call control unit 250, control unit 255 of the conversion unit 251, protocol conversion unit 260 and the packetizing unit 156 may, of course, be implemented by a program executed on a computer constituting a gateway apparatus 210, such as a processor, a CPU or a data processor. There is also provided a computer-readable recording medium in which the program is stored.

According to the above-described exemplary embodiment, there is provided a gateway apparatus that is able to establish interconnection between an existing mobile terminal connected to the mobile circuit switched network and a partner terminal, which may be any suitable terminal, such as a terminal connected to the mobile circuit switched network via the mobile IMS network, a terminal connected to a fixed network via the mobile IMS network or a terminal connected to a mobile broadband network via the mobile IMS network. For any of the above combinations of the existing mobile terminal connected to the mobile circuit switched network, and the partner terminal, it is possible to provide a gateway apparatus whereby the voice telephone may be implemented without the necessity of terminal remodeling.

The disclosure of the aforementioned Patent Document 1 is incorporated by reference herein. The particular exemplary embodiments or examples may be modified or adjusted within the gamut of the entire disclosure of the present invention, inclusive of claims, based on the fundamental technical concept of the invention. Further, variegated combinations or selection of elements disclosed herein may be made within the framework of the claims. That is, the present invention may encompass various modifications or corrections that may occur to those skilled in the art in accordance with the within the gamut of the entire disclosure of the present invention, inclusive of claim and the technical concept of the present invention.

What is claimed is:

1. A gateway apparatus arranged between a mobile circuit switched network and a mobile IMS (IP Multimedia Subsystem) network, the apparatus comprising:
   a call control unit that converts a control signal received from the mobile circuit switched network and outputs a signal converted to the mobile IMS network; and
   a conversion unit that checks a plurality of types of a network to perform protocol conversion of a line switching protocol for an audio signal received from a communication terminal on the mobile circuit switched network side, and makes a decision on a type of a network beyond the mobile IMS network from among the plurality of types, or on a type of a partner terminal which is a connection target, using control information output from the mobile IMS network and received by the call control unit, and that performs, based on a result of the decision, protocol conversion of the line switching protocol for the audio signal received from the communication terminal on the mobile circuit switched network side and outputs a protocol converted signal to the mobile IMS network.

2. The gateway apparatus according to claim 1, wherein the call control unit converts the control signal output from the mobile circuit switched network into at least one of SIP (Session Initiation Protocol) and SDP (Session Description Protocol) and outputs a signal converted to the mobile IMS network, and wherein the conversion unit receives a line switching protocol for audio output from the mobile circuit switched network, and
   makes a decision on a type of a network of a partner terminal connected via the mobile IMS network or on a type of the partner terminal, using at least one of SIP and SDP output from the mobile IMS network and received by the call control unit.

3. The gateway apparatus according to claim 1, wherein the conversion unit comprises:
   a control/analysis unit;
   a protocol conversion unit; and
   a packetizing unit,
   wherein the call control unit receives a call control signal from the mobile circuit switched network, converts the call control signal into a control signal adapted to the mobile IMS network and transmits the control signal converted to the mobile IMS network,
   the call control unit receives a control signal from the mobile IMS network and receives information on a type of a network connected beyond the mobile IMS network or on a type of the partner terminal which is a connection target, and
   the call control unit outputs, out of information contained in the call control signal received from the mobile circuit switched network and information contained in the control signal received from the mobile IMS network, required information, on a per-channel basis,
   wherein the control/analysis unit compares the information on a per-channel basis, received from the call control unit to make a decision on whether or not protocol conversion is needed, and outputs, on a per-channel basis, a result of the decision and information on the conversion as to which conversion is to be performed in case the protocol conversion is needed,
   wherein the protocol conversion unit receives a line switching protocol signal from the mobile circuit switched network and reads out a compression encoded bit stream of speech,
   the protocol conversion unit receives the result of the decision and the information on the conversion from the control/analysis unit, on a per-channel basis, and
   the protocol conversion unit executes, in case the protocol conversion is needed, protocol conversion for the compression encoded bit stream of speech, in accordance with the information on the conversion to generate payload information, and
   wherein the packetizing unit receives the payload information from the protocol conversion unit, stores the payload information in a packet, and outputs the packet to the mobile IMS network.

4. The gateway apparatus according to claim 1, wherein the conversion unit comprises:
   a control unit;
   a protocol conversion unit; and
   a packetizing unit, wherein the call control unit receives a call control signal from the mobile circuit switched network, converts the call control signal into a control signal adapted for the mobile IMS network and transmits the control signal converted to the mobile IMS network, the call control unit receives a control signal from the mobile IMS network and receives information on a type of a network which is connected beyond the mobile IMS network or on a type of a partner terminal which is a connection target, and the call control unit outputs, out of information contained in the call control signal received from the mobile circuit switched network and information contained in the control signal received from the mobile IMS network, required information, on a per-channel basis, wherein the control unit analyzes the information received from the call control unit and issues an instruction to perform always unique protocol conversion for each channel, wherein the protocol conversion unit receives the instruction from the control unit to perform always unique conversion for each channel, and the protocol conversion unit receives a line switching protocol signal from the mobile circuit switched network, reads out a compression encoded bit stream of speech from the signal received, constructs a preset format header and stores the compression encoded bit stream of speech in a payload section, and wherein the packetizing unit receives the payload information from the protocol conversion unit, stores the payload information in a packet, and outputs the packet to the mobile IMS network.

5. The gateway apparatus according to claim 1, wherein the call control unit converts a control signal output from the mobile circuit switched network into at least one of SIP (Session Initiation Protocol) and SDP (Session Description Protocol) to output a signal converted to the mobile IMS network, and wherein the conversion unit receives a line switching protocol for an audio signal, output from the mobile circuit switched network, the conversion unit makes a decision, using at least one of the SIP and the SDP output from the mobile IMS network and received by the call control unit, on whether a partner terminal is connected via the mobile IMS network to the mobile circuit switched network, the partner terminal is connected via the mobile IMS network to a fixed network, or the partner terminal is connected via the mobile IMS network to a mobile broadband network, and the conversion unit converts the line switching protocol received into a different protocol, depending on a result of the decision, and outputs the different protocol converted to the mobile IMS network.

6. The gateway apparatus according to claim 1, wherein the call control unit converts a control signal output from the mobile circuit switched network into at least one of SIP (Session Initiation Protocol) and SDP (Session Description Protocol) and outputs a signal converted to the mobile IMS network, and wherein the conversion unit receives a line switching protocol for an audio signal, output from the mobile circuit switched network, the conversion unit converts the line switching protocol received into a same protocol, without dependency on whether a partner terminal is connected via the mobile IMS network to the mobile circuit switched network, the partner terminal is connected via the mobile IMS network to a fixed network, or the partner terminal is connected via the mobile IMS network to a mobile broadband network, the conversion unit outputs the protocol converted to the mobile IMS network.

7. A gateway method in a gateway apparatus arranged between a mobile circuit switched network and a mobile IMS (IP Multimedia Subsystem) network, the method comprising:

converting a control signal from the mobile circuit switched network to output a signal converted to the mobile IMS network;

checking a plurality of types of a network to perform protocol conversion of a line switching protocol for an audio signal received from a communication terminal on the mobile circuit switched network side and making decision on a network beyond the mobile IMS network from among the plurality of types or on a type of a partner terminal, which is a connection target, using control information received from the mobile IMS network, and converting the line switching protocol for the audio signal received from the communication terminal on the mobile circuit switched network side to a different protocol, depending on a result of the decision and outputting a protocol converted signal to the mobile IMS network.

8. The gateway method according to claim 7, comprising:

converting a control signal output from the mobile circuit switched network into at least one of SIP (Session Initiation Protocol) and SDP (Session Description Protocol) and outputting a signal converted to the mobile IMS network;

receiving a line switching protocol for audio, output from the mobile circuit switched network; and making a decision on a network of a partner terminal connected via the mobile IMS network or on a type of the partner terminal, using at least one of SIP (Session Initiation Protocol) and SDP (Session Description Protocol) output from the mobile IMS network.

9. The gateway method according to claim 7, comprising:

converting a control signal output from the mobile circuit switched network into at least one of SIP (Session Initiation Protocol) and SDP (Session Description Protocol) and outputting a signal converted to the mobile IMS network;

receiving a line switching protocol for an audio signal, output from the mobile circuit switched network;

making a decision, using at least one the SIP and the SDP output from the mobile circuit switched network, on whether the partner terminal is connected via the mobile IMS network to the mobile circuit switched network, the partner terminal is connected via the mobile IMS network to a fixed terminal, or the partner terminal is connected via the mobile IMS network to a mobile broadband network, converting the line switching protocol received into a different protocol, depending on a result of the decision, and outputting the protocol converted signal to the mobile IMS network.

10. The gateway method according to claim 7, comprising:

converting a control signal output from the mobile circuit switched network into at least one of SIP (Session Initiation Protocol) and SDP (Session Description Protocol) and outputting a signal converted to the mobile IMS network;

receiving a line switching protocol for an audio signal, output from the mobile circuit switched network;

converting the line switching protocol received into a same protocol, without dependency on whether the partner terminal is connected via the mobile IMS network to the mobile circuit switched network, the partner terminal is connected via the mobile IMS network to a fixed network, or the partner terminal is connected via the mobile IMS network to a mobile broadband network, and outputting the protocol converted signal to the mobile IMS network.

11. A non-transitory computer-readable recording medium storing a program that causes a gateway apparatus, arranged between a mobile circuit switched network and a mobile IMS (IP Multimedia Subsystem) network, to execute the processing comprising:

converting a control signal received from the mobile circuit switched network and outputting a signal converted to the mobile IMS network;

checking a plurality of types of a network to perform protocol conversion of a line switching protocol for an audio signal received from a communication terminal on the mobile circuit switched network side and making a decision on a type of a network connected beyond the mobile IMS network from among the plurality of types or on a type of a partner terminal which is a connection target, using control information received from the mobile IMS network; and converting the line switching protocol for the audio signal received from the communication terminal on the mobile circuit switched network side into a different protocol, based on a result of the decision and outputting a protocol converted to the mobile IMS network.

12. The non-transitory computer-readable recording medium according to claim 11, storing a program causing the gateway apparatus to execute the processing comprising:

converting a control signal output from a mobile circuit switched network into at least one of SIP (Session Initiation Protocol) and SDP (Session Description Protocol) and outputting a signal converted to the mobile IMS network;

receiving a line switching protocol for an audio signal, output from the mobile circuit switched network;

deciding on a type of a network of a partner terminal connected via the mobile IMS network or the type of the partner terminal using at least one of SIP (Session Initiation Protocol) and SDP (Session Description Protocol) output from the mobile IMS network.

13. The non-transitory computer-readable recording medium according to claim 11, storing a program causing the gateway apparatus to execute the processing comprising:

converting a control signal output from the mobile circuit switched network into at least one of SIP (Session Initiation Protocol) and SDP (Session Description Protocol) and outputting a signal converted to the mobile IMS network;

receiving a line switching protocol for an audio signal, output from the mobile circuit switched network;

making a decision, using at least one of the SIP and the SDP output from the mobile circuit switched network, on whether the partner terminal is connected via the mobile IMS network to the mobile circuit switched network, the partner terminal is connected via the mobile IMS network to a fixed terminal, or the partner terminal is connected via the mobile IMS network to a mobile broadband network, and converting the line switching protocol received into a different protocol depending on a result of the decision and outputting the protocol converted signal to the mobile IMS network.

14. The non-transitory computer-readable recording medium according to claim 11, storing a program causing the gateway apparatus to execute the processing comprising:

converting a control signal output from the mobile circuit switched network into at least one of SIP (Session Initiation Protocol) and SDP (Session Description Protocol) and outputting a signal converted to the mobile IMS network;

receiving a line switching protocol for an audio signal, output from the mobile circuit switched network;

converting the line switching protocol received into a same protocol, without dependency on whether the partner terminal is connected via the mobile IMS network to the mobile circuit switched network, the partner terminal is connected via the mobile IMS network to a fixed network, or the partner terminal is connected via the mobile IMS network to a mobile broadband network, and outputting the protocol converted signal to the mobile IMS network.

* * * * *